United States Patent [19]

Hirata et al.

[11] Patent Number: 5,099,338
[45] Date of Patent: Mar. 24, 1992

[54] STILL PICTURE RECORDING DEVICE AND METHOD FOR PARTLY OVERLAPPING RECORDED VIDEO SIGNALS

[75] Inventors: Masafumi Hirata; Takeyoshi Ito, both of Tokyo, Japan

[73] Assignee: Fuji Photo Film Co., Ltd., Kanagawa, Japan

[21] Appl. No.: 380,542

[22] Filed: Jul. 17, 1989

[30] Foreign Application Priority Data

Jul. 15, 1988 [JP] Japan ................. 63-175157

[51] Int. Cl.$^5$ ........................................... H04N 5/781
[52] U.S. Cl. ................................. 358/342; 358/335; 358/906
[58] Field of Search .............. 358/21 R, 11, 148, 342, 358/335, 906, 909, 341; 360/121, 122, 125, 128, 35.1, 27, 106, 100.1, 87, 77.02, 77.14, 106, 107, 10.1, 10.2, 10.3, 14.1, 14.2, 14.3, 77.07; 369/126, 43, 111

[56] References Cited

U.S. PATENT DOCUMENTS

| | | | |
|---|---|---|---|
| 4,692,815 | 9/1987 | Kawahara et al. | 360/35.1 |
| 4,811,133 | 3/1989 | Nakadia et al. | 360/77.03 |
| 4,862,304 | 8/1989 | Yunoki et al. | 360/121 |
| 4,914,526 | 4/1990 | Sakata et al. | 369/48 |

FOREIGN PATENT DOCUMENTS 62-183686  8/1987  Japan .

*Primary Examiner*—Robert L. Richardson
*Assistant Examiner*—Huy Nguyen

[57] ABSTRACT

A still picture recording device is provided which uses a PG signal, generated in a yoke in accordance with the rotation of a magnetic disc using a PG yoke, as a timing signal for recording video signals. A second PG signal is produced from a first signal obtained by waveform-shaping a detection signal of the PG sensor. The recording of a video signal is initiated in response to the first PG signal, and the recording of the video signal on a recording track is completed responsive to the second PG signal.

6 Claims, 12 Drawing Sheets

STILL PICTURE RECORDING DEVICE AND METHOD FOR PARTLY OVERLAPPING RECORDED VIDEO SIGNALS

BACKGROUND OF THE INVENTION

In a still video system which records video signals on a magnetic disc, a rotational position detection signal from a rotating magnetic disc is used in a servo system for a magnetic disc drive motor and in the head selection for frame recording. The rotational position detection signal, or the so-called PG (pulse generator) signal, as illustrated in FIG. 9, is obtained when a PG yoke 2 provided on a magnetic disc 1 passes over a predetermined position (the position of a PG sensor 3) as the magnetic disc rotates.

One pulse of the PG signal is obtained every time the magnetic disc 1 makes one full turn. Specifically, the detection signal from the PG sensor 3 is waveform-shaped to obtain an APG signal (first PG signal), and then a square-pulse NPG signal (the second PG signal) is produced. Conventionally, the second PG signal has been used as the PG signal in the video signal recording.

The second PG signal is produced from the detection signal of the PG sensor 3 at the timing as illustrated in FIG. 10. An output (a) of the PG sensor 3 is first inverted to produce a signal (b). The inverted signals is then converted to a signal (c) by a zero-cross detector, and integrated into a signal (d). The integrated signal is converted to a first PG signal (e) by a hysteresis comparator, and integrated into a signal (f). This integrated signal is and converted to a second PG signal (g) by a hysteresis comparator.

However, the second PG signal (g) has a problem of position shift. For example, if a hum exists in a waveform shaping circuit when the second PG signal is produced, a second PG signal with a shifted phase is produced, which causes fluctuations in the second PG signal. This fluctuation causes an inconsistent length for 1 turn of the magnetic disc, which results in the recording of the video signal to be partially missing.

SUMMARY OF THE INVENTION

In accordance with an embodiment of the present invention, a still picture recording device is provided which uses a PG signal generated in accordance with the rotation of a magnetic disc as a timing signal for recording. The device comprises means for producing a second PG signal from a first PG signal, means for starting the recording of a video signal in response to the first PG signal, means for and finishing the recording on one track of the video signal in response to the second PG signal. By starting the recording in response to the first PG signal and finishing the recording in response to the second PG signal, a longer recording time is obtained than in the case when only the first PG signal or the second PG signal is used. Also, the first and last recorded video signals are partly overlapped, so that the missing of the video signal is prevented even if a shift occurs in the second PG signal.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
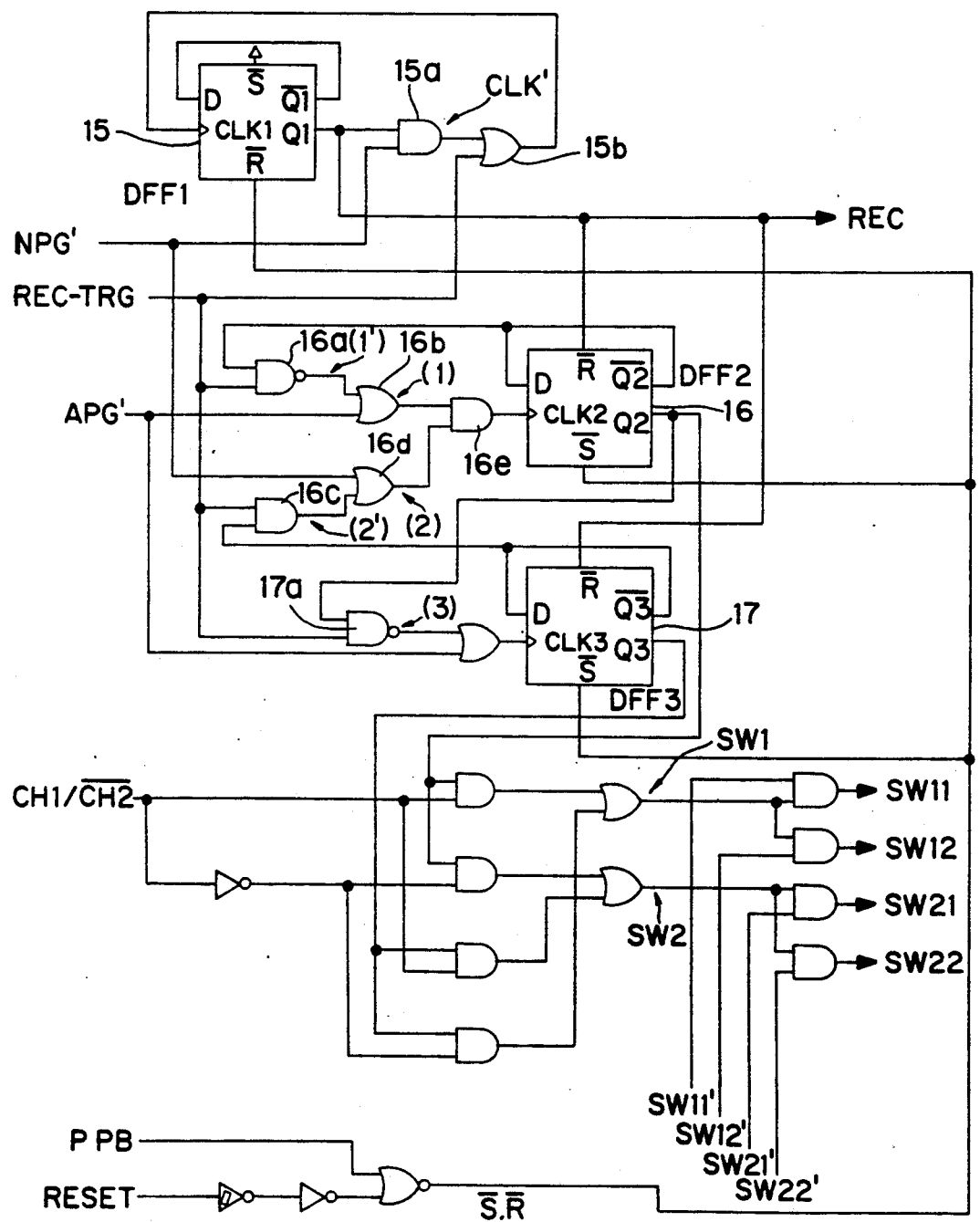
FIG. 1 is a block diagram of an embodiment for an overlap of the present invention recording circuit mode for the embodiment of FIG. 1.

A preferred embodiment of the present invention will now be described with reference to FIGS. 1 to 8. FIG. 7 is a block diagram illustrating a video signal recording system including a PG circuit in an electronic still camera. FIG. 7 includes a CCD device 4 for photoelectric conversions, a signal processing circuit 5, Y-FM and C-FM modulation circuits 6, a recording amplifier 7, a recording gate 8 and a magnetic head 9. A PG sensor 3 for detecting the passage of a PG yoke of a magnetic disc 1 is connected to the recording gate 8, a mechanical control circuit 11, a system control circuit 12, and the signal processing circuit 5 through a PG circuit 10. The PG circuit 10 outputs a PG signal for one turn of the magnetic disc and points of time for the initiation and completion for the recording to the above various circuits for switching and moving the head.

Figure 8:
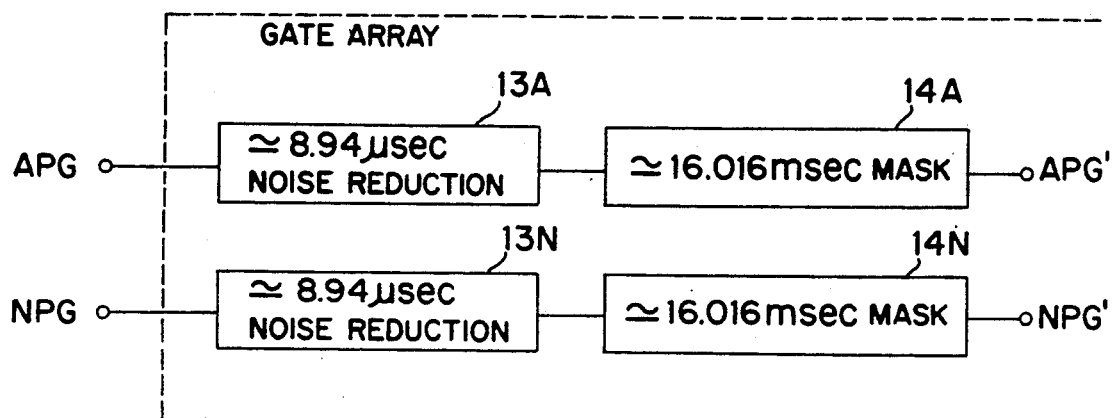
FIG. 8 is a block diagram illustrating a noise reduction unit.
Figure 9:
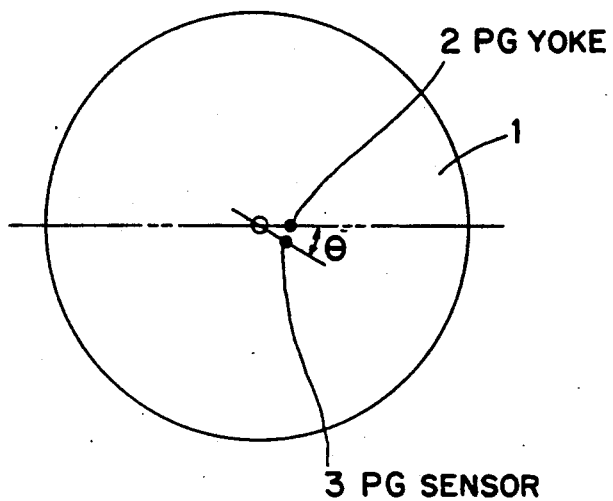
FIG. 9 is a schematic illustrating a PG signal.
Figure 10:
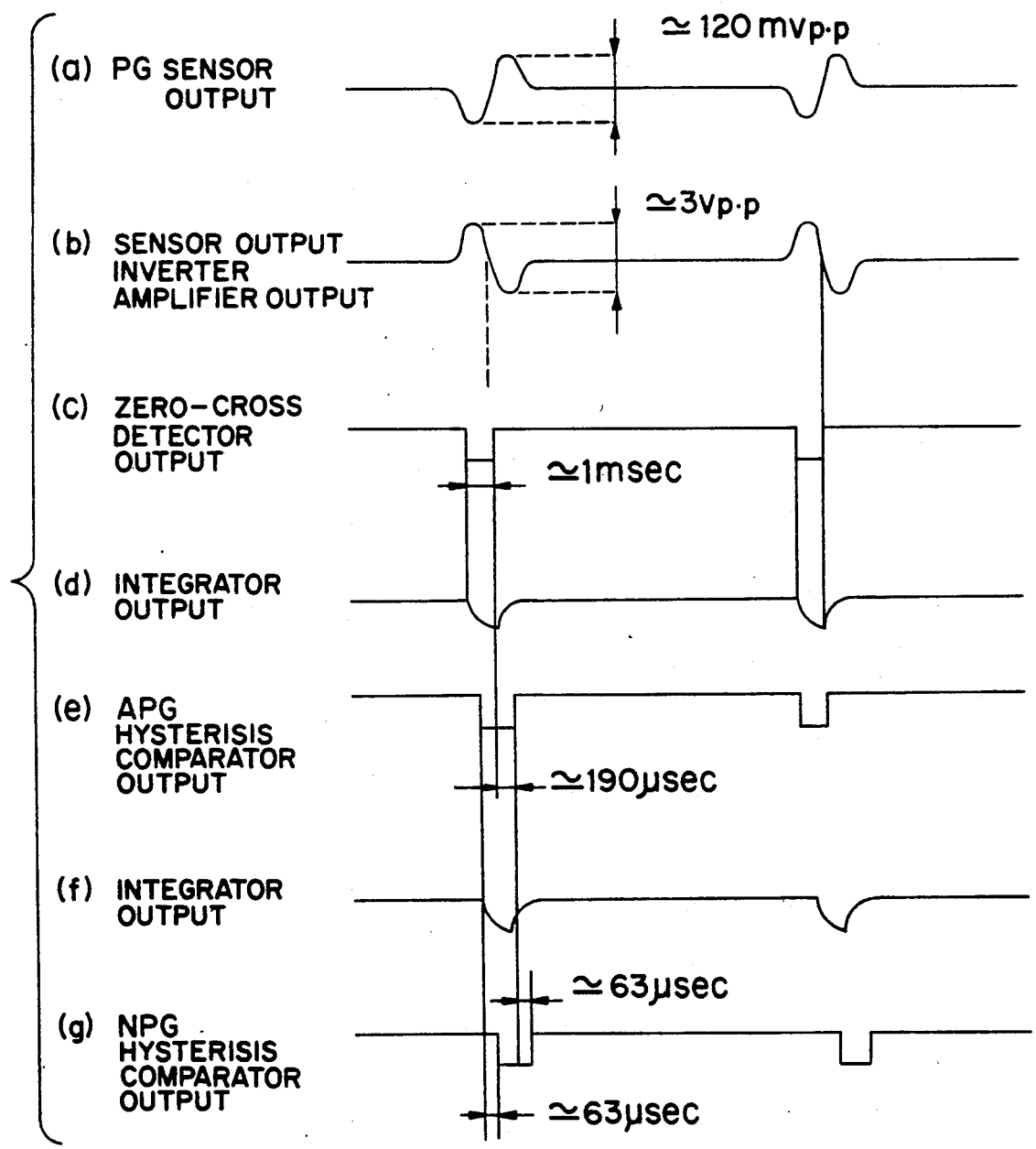
FIG. 10 is a schematic illustrating waveforms of a PG signal.

The PG circuit 10 develops a first PG signal (APG) (e) and a second PG signal (NPG) (g) as illustrated in FIG. 10 by the signal from the PG sensor. Furthermore, noise reduction circuits 13A and 13N and mask circuits 14A and 14N, as illustrated in FIG. 8, remove a short-time ON/OFF noise and a continuous noise of a predetermined period, to develop a noise-removed first PG signal (APG') and a noise-removed second PG signal (NPG').

An overlap recording circuit, which uses the noise-removed first PG signal (APG') and the noise-removed second PG signal (NPG'), will be described next with reference to FIG. 1. The overlap recording circuit a part of the PG circuit 10. The overlap circuit includes a first DFF (D flip-flop) 15 which develops a REC signal for operating the recording amplifier 7 (FIG. 7), a second DFF 16 which produces a recording control signal for field recording or frame recording of the first field a third DFF 17 which produces a recording control signal for frame recording of the second field and a gate array which controls the recording gate 8 (FIG. 7). In the first DFF 15, a terminal D and a terminal $\overline{Q_1}$ are connected, and a terminal $Q_1$ is connected to a clock terminal CLK1 through an AND gate 15a and an OR gate 15b. The OR gate 15b has a recording trigger signal (terminal RECTRG) from a microprocessor input thereto. As a result, output $Q_1$ of the DFF 15, as illustrated by the waveforms in the field mode of FIG. 2, goes to an "H" level and is synchronized with the rising edge of the recording trigger RECTRG. According to the falling edge of RECTRG, the output $Q_1$ goes to an "L" level at the rising edge of the second PG signal NPG'. During the period of the output $Q_1$, the REC signal is at an "H" level and the recording amplifier 7 is on. A PB signal indicates the reproduction signal from the recording and reproduction signals and the first DFF is reset by the PB signal and a reset signal RESET. The $Q_1$ signal resets DFF 16 and 17. When the $Q_1$ signal and the REC signal are both at an "L" level, the SW1 and SW2 signal are both at a "L" level, which is not a recording enable status. The switches SW1 and SW2 are ON/OFF control switches for the recording gate 8 (FIG. 7), which will be described later.

Figure 3:
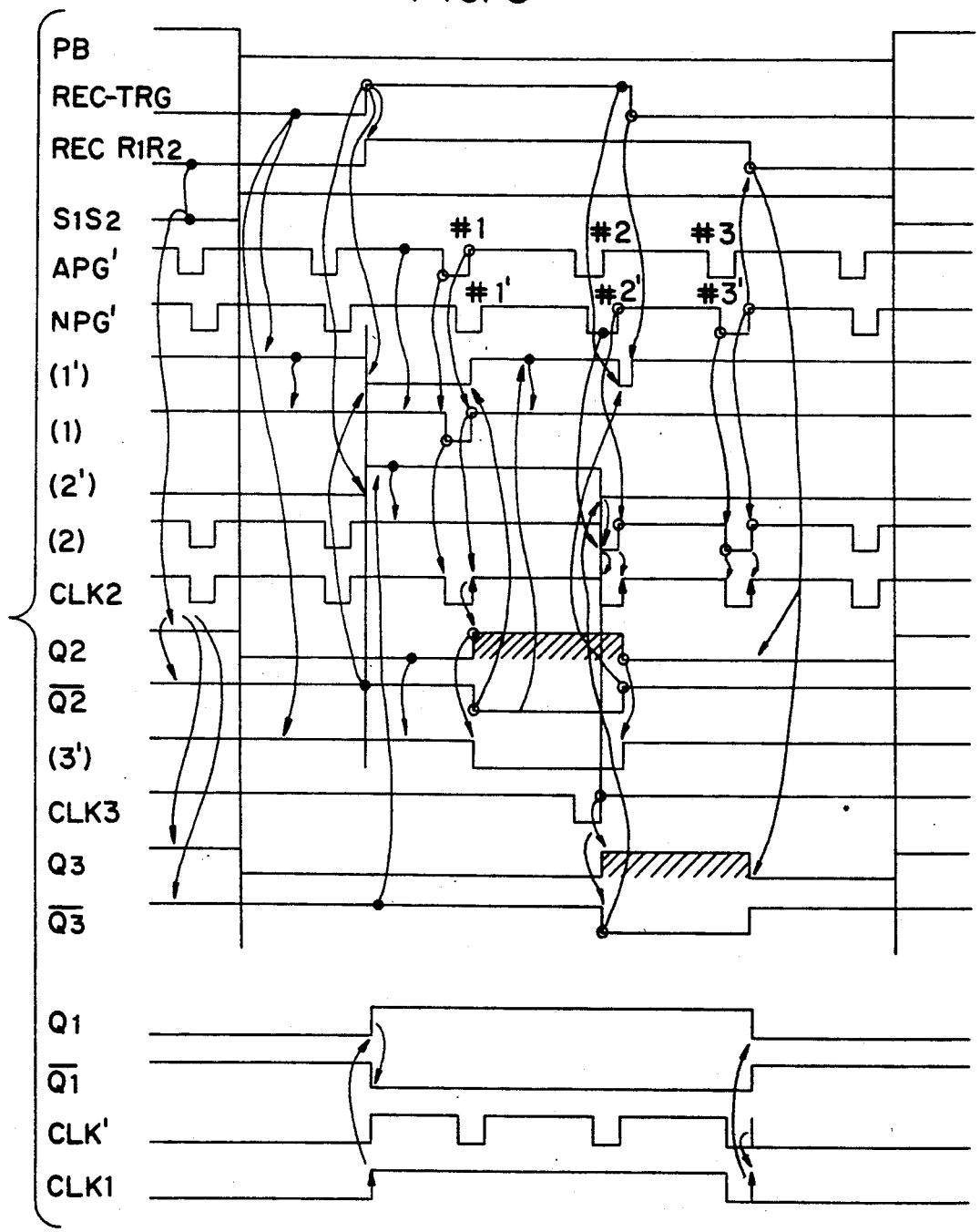
FIG. 3 is a schematic illustrating waveforms in a frame mode for the embodiment of FIG. 1.

The second DFF 16 produces a control signal $Q_2$ for recording in the field mode, or for recording the first half field in the frame mode illustrated in FIG. 3. The second DFF 16 has a NAND gate 16a which has signals from the terminal D and the terminal $\overline{Q_2}$ of the second DFF 16 and the recording trigger RECTRG input thereto, on OR gate 16b which has the output of the NAND gate 16a and the first PG signal APG' input thereto, an AND gate 16c which has signals from the terminal D and a terminal $\overline{Q_3}$ of the third DFF 17 and the recording trigger RECTRG input thereto, an OR gate 16d which has the output of the AND gate 16c and the second PG signal NPG' input thereto, and an AND gate 16e which has the outputs of the OR gates 16b and 16d input thereto. The output of the AND gate 16e is inputted to a clock CLK2 of the second DFF 16.

Output (1') of the NAND gate 16a goes to an "L" level in response to the $\overline{Q_2}$ signal and the recording trigger RECTRG being reset. Output (1) of the OR gate 16b goes to an "H" level in response to the first rising edge of the first PG signal APG'. The output $Q_2$ goes to a "L" level in response to the rising edge of of the second PG signal NPG' by the OR gate 16d. In this case, the second PG signal NPG' occurs immediately after the first PG signal APG', and the input of the second PG signal NPG' into CLK2 is inhibited by a signal (2'). Thereby, the output $Q_2$ does not go to an "L" level in response to the second PG signal NPG' (inhibition of #1'). After the output $Q_2$ to an "H" level, when the second rising edge of the first PG signal APG' occurs, the second PG signal NPG' is inputted to CLK2 through the OR gate 16d, and the output $Q_2$ is reversed from an "H" level to an "L" level.

In the field which records only a single field, the third DFF 17 is not needed. As a result, during the period from the rising edge to the falling edge of the output $Q_2$ illustrated in FIG. 2, the gate circuit of SW1 is set on, and SW11 and SW12 of the recording gate 8, which are also illustrated in FIG. 7, are set on. SW11' to SW22' indicate switching terminal circuits as in a conventional device, and the device according to the present embodiment can be configured in addition to an existing device as illustrated in FIG. 1.

Figure 2:
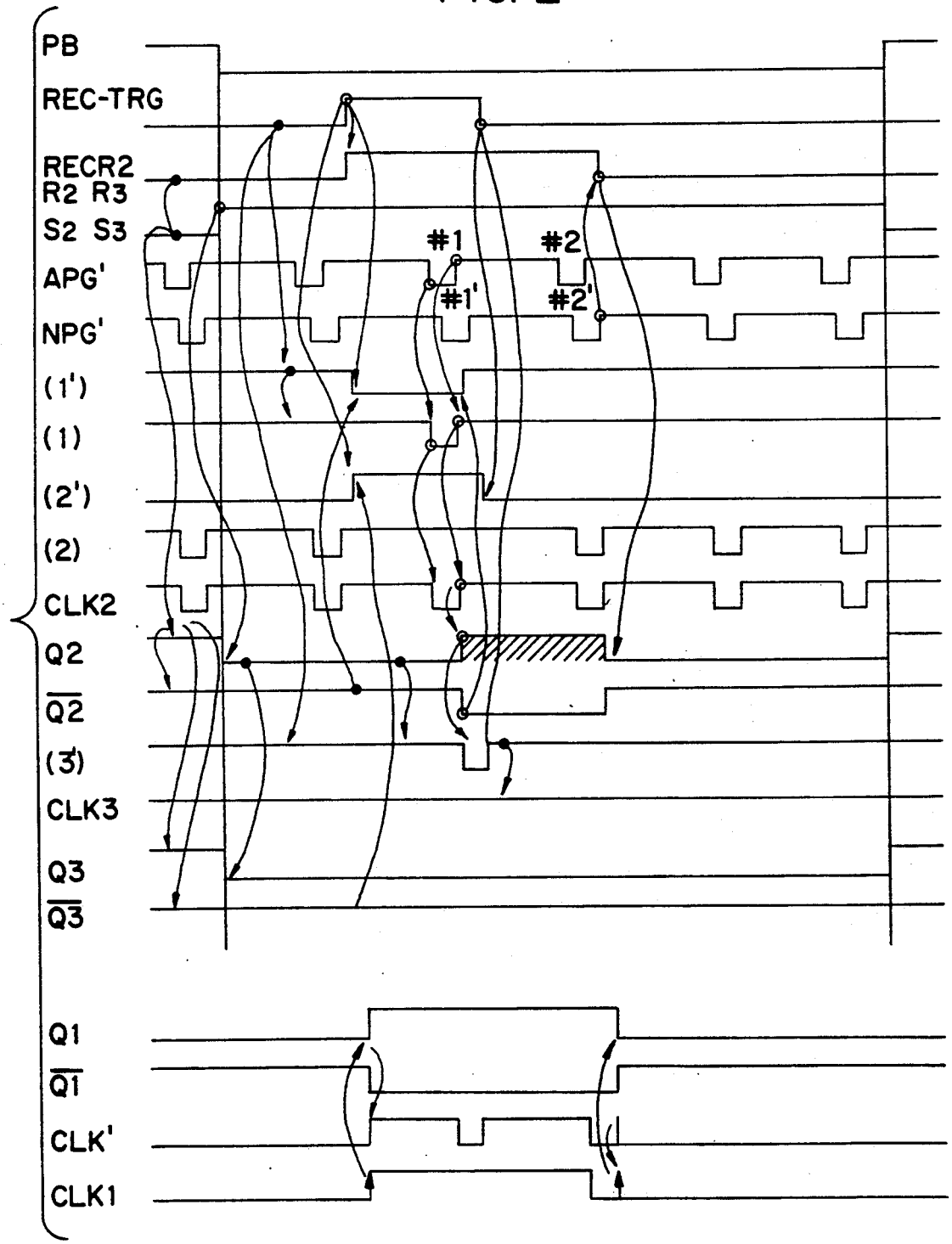
FIG. 2 is a schematic illustrating waveforms in a field mode for the embodiment of FIG. 1.

FIG. 3 is a schematic illustrated waveforms in the frame mode, which are different than the waveforms of FIG. 2 because of the fact that the length of the recording trigger RECTRG is set to a length which includes the PG signal for frame recording, and the output signal (1') of the NAND gate 16a appears at the rear end of the recording trigger RECTRG. In the third DFF 17, as in the case of the second DFF 16, $\overline{Q_3}$ goes to an "H" level only in response to the REC signal at being an L level. The first and second PG signals APG' and NPG' of the first field are inhibited by output (3') of a NAND gate 17a. Thus, the output (3') is enabled only when $Q_2$ is at an "H" level, and is inputted to clock CLK3 at the second rising edge of the first PG signal APG'.

Figure 4:
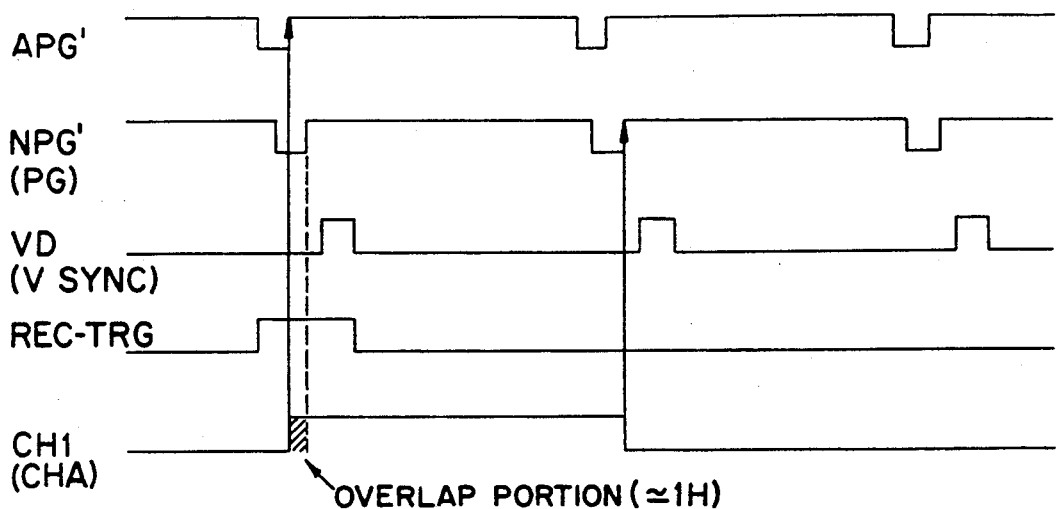
FIG. 4 is a schematic illustrating simplified waveforms in the field mode for the embodiment of FIG. 1.
Figure 5:
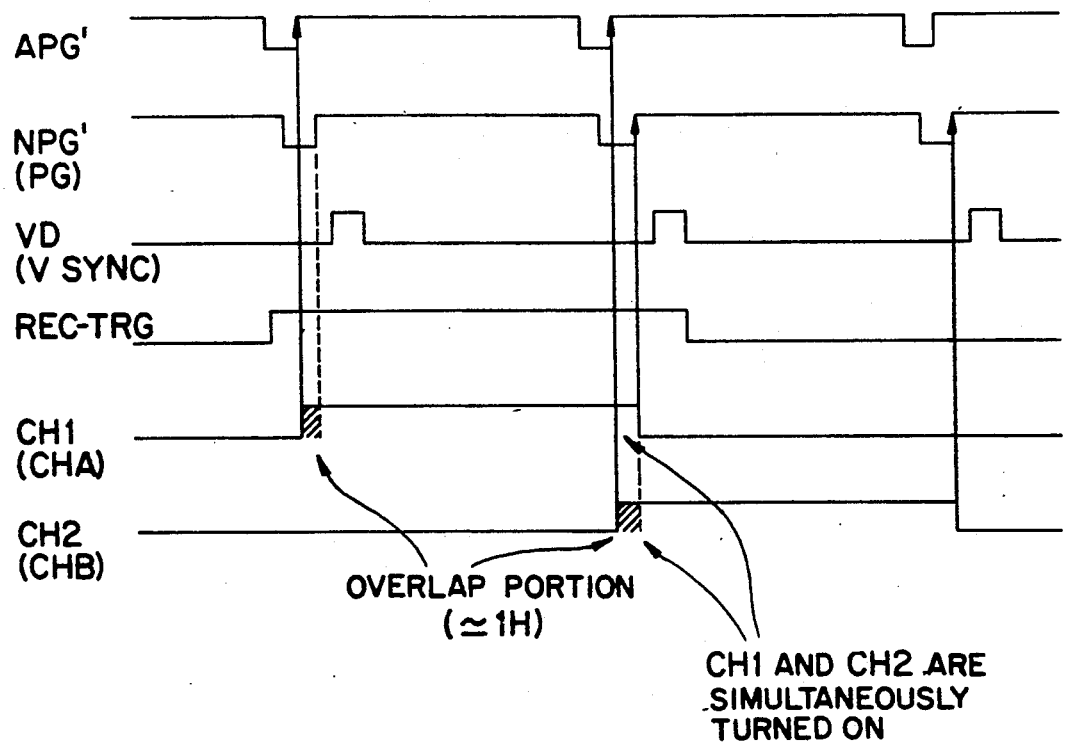
FIG. 5 is a schematic illustrating simplified waveforms in the frame mode for the embodiment of FIG. 1.

As described above, either in field recording or frame the recording, recording is started in response to an "H" level output from the second DFF 16 and the third DFF 17 developed by the first PG signal APG', and ended in response to an L level output from the second DFF 16 and the third DFF 17 developed by the second NPG'. Thus, in field recording, as illustrated in FIG. 4, the recording is started by a CH1 signal to produce the shaded overlap portion (pre-overlap portion). In frame recording, as illustrated in FIG. 5, the recording is started by the CH1 and CH2 signals to produce the shaded portion (pre-overlap portion). In frame recording, there is a portion where the CH1 and CH2 signals are both ON.

As a result, the switches SW11 and SW12 are turned on by the CH1 signal to make field recording of that track or frame recording of the first field. The switches SW21 and SW22 are turned on by the CH2 signal for frame recording of the second field.

Figure 6:
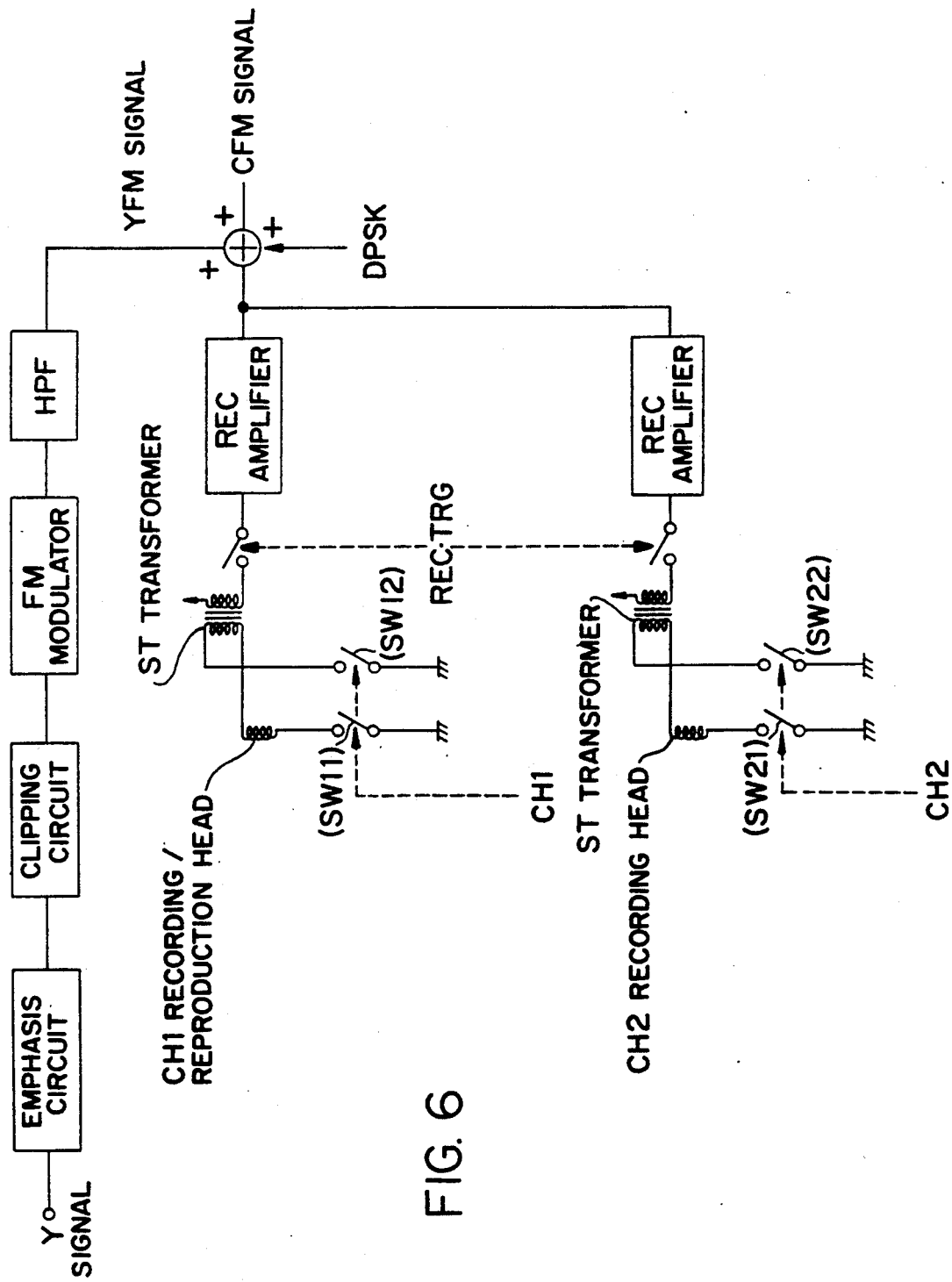
FIG. 6 is a block diagram of a recording system illustrating a switch unit.
Figure 7:
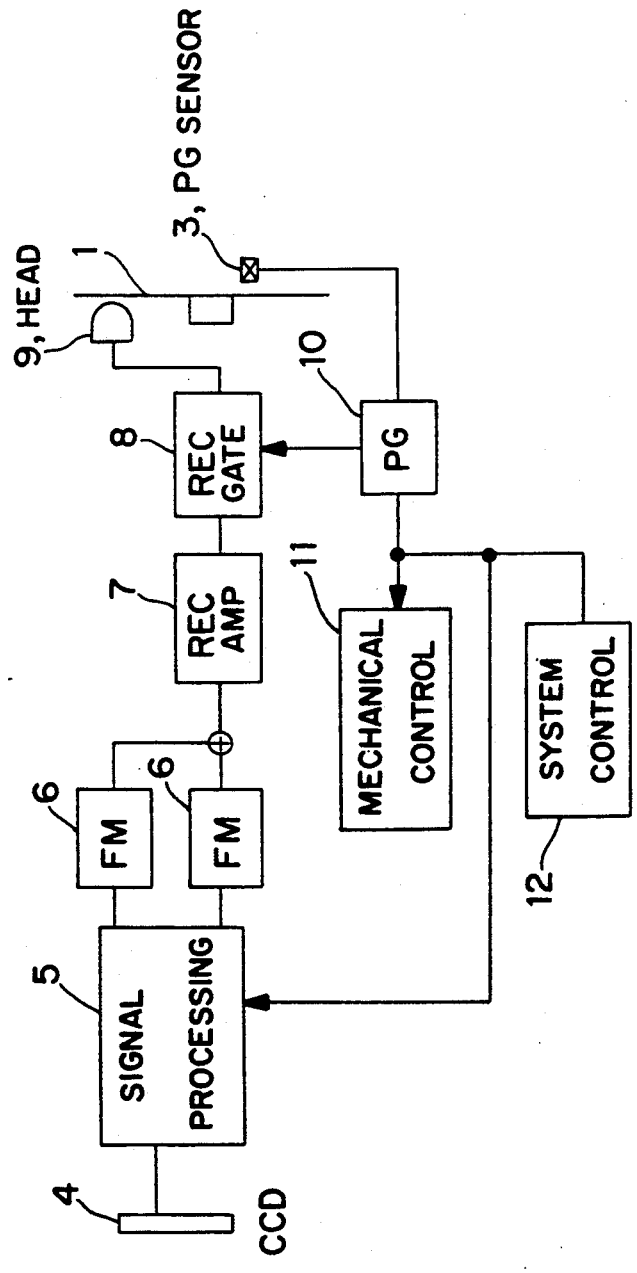
FIG. 7 is a block diagram illustrating a PG circuit.

FIG. 6 is a block diagram of a recording system illustrating the switches SW11, SW12, SW21 and SW22, and the recording trigger RECTRG. The recording trigger RECTRG is turned on at the timing illustrated in FIG. 2 and FIG. 3, the switches SW11 and SW12 are turned on at the shaded portion illustrated in FIG. 2 and FIG. 3 (CH1 in FIG. 4 and FIG. 5), and the switches SW21 and SW22 are turned on at the shaded portion illustrated in FIG. 3 (CH2 in FIG. 5).

Figure 11:
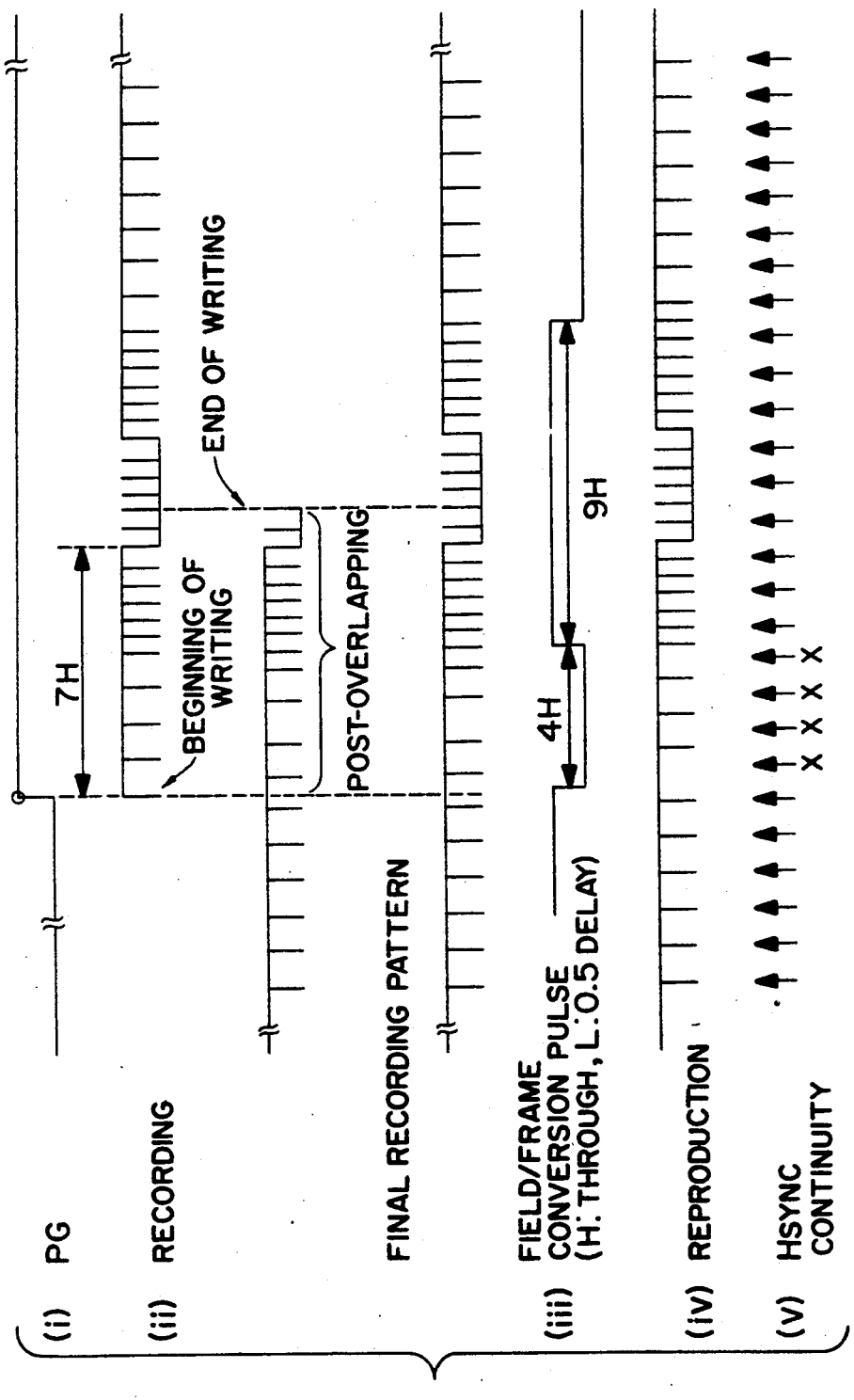
FIG. 11 is a schematic illustrating post-overlapping for field recording.

As described above, missing of the video signal is prevented by the pre-overlapping, in which recording is started in response to the first PG signal prior to the normal PG signal. In addition to the pre-overlapping, when overlap recording is generalized, it can also be considered a so-called post-overlapping, in which recording is ended after the normal PG signal. Such post-overlapping will be described next. In the case of an 8 H post-overlapping in field recording, as illustrated in FIG. 11, since recording (ii) is started at the timing of PG (i) and a field/frame conversion pulse (iii) appears from 0.5 H, continuity of $H_{SYNC}$ is deteriorated in the reproduction as indicated by the marks "x", and a skew is caused.

Figure 12:
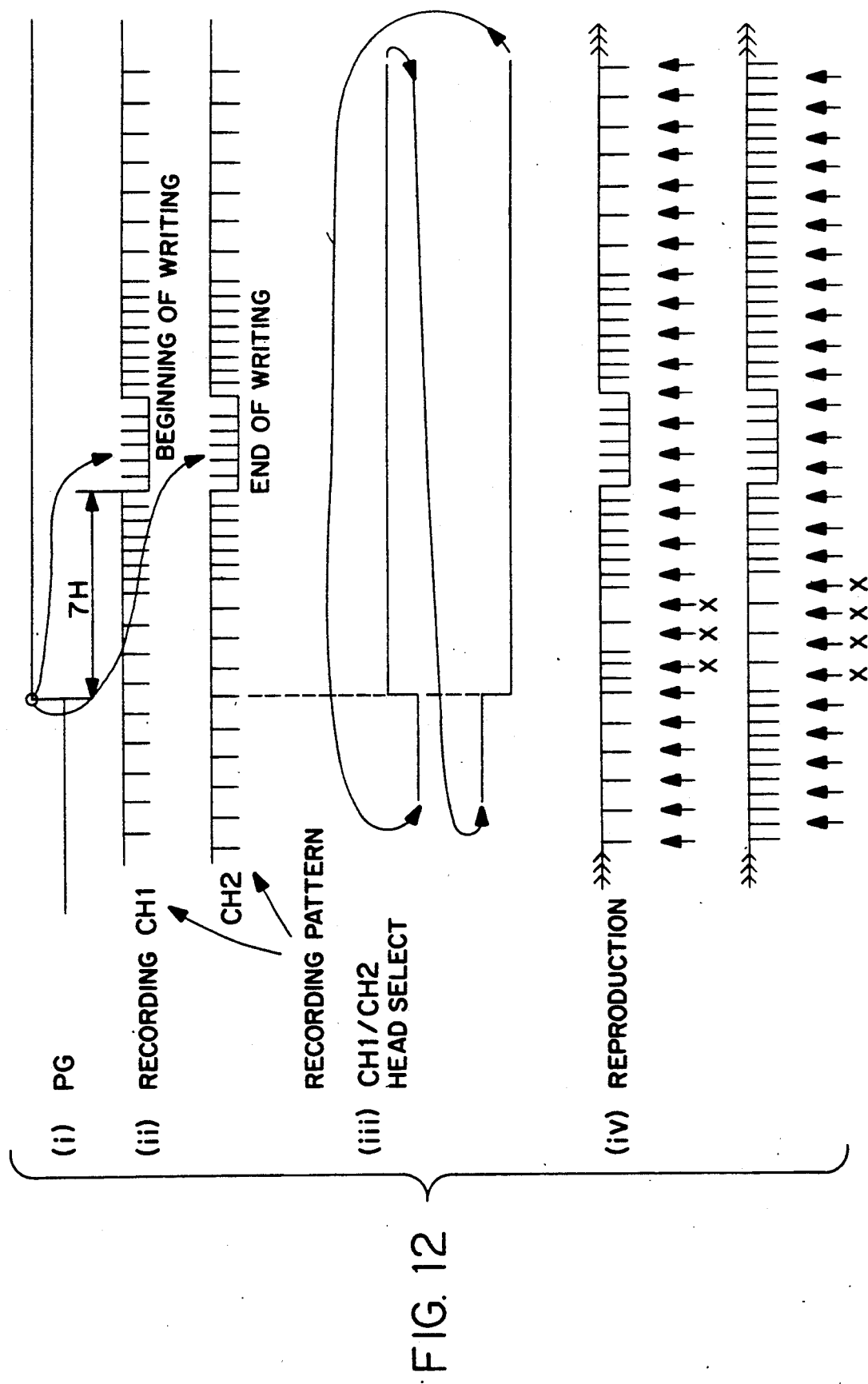
FIG. 12 is a schematic illustrating post-overlapping for frame recording.

In the case of an 8H post-overlapping in frame recording, as illustrated in FIG. 12, when the recording of CH1 is started after 8 H from the timing of PG (i) and the recording of CH2 is ended after 8 H, continuity of $H_{SYNC}$ is deteriorated in the reproduction as indicated by the marks "x".

In such a post-overlapper, a skew may occur even with 1 H an other than an 8 H.

Figure 13:
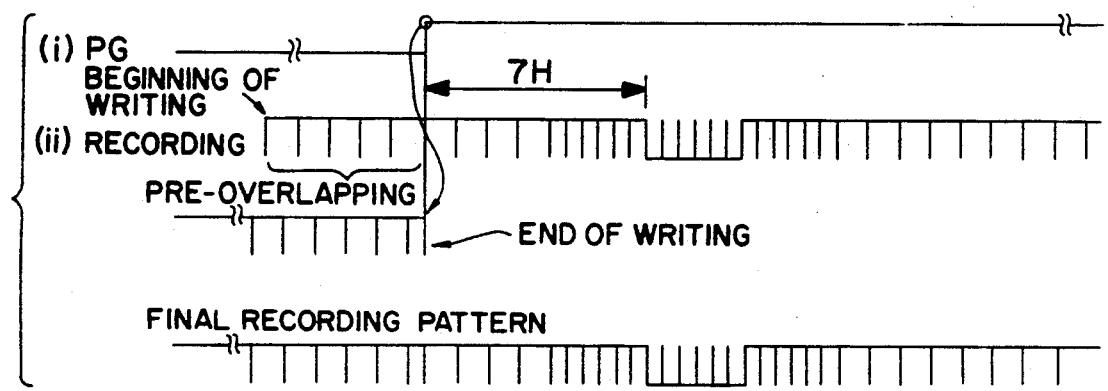
FIG. 13 is a schematic illustrating pre-overlapping for field recording.

In the case of pre-overlapping, on the other hand, as illustrated in FIG. 13(ii), the overlap portion at the beginning is replaced with the end recording, and the final recording pattern is the same as the pattern of an ordinary field recording with no overlapping. Thereby, the continuity of $H_{SYNC}$ is maintained.

Figure 14:
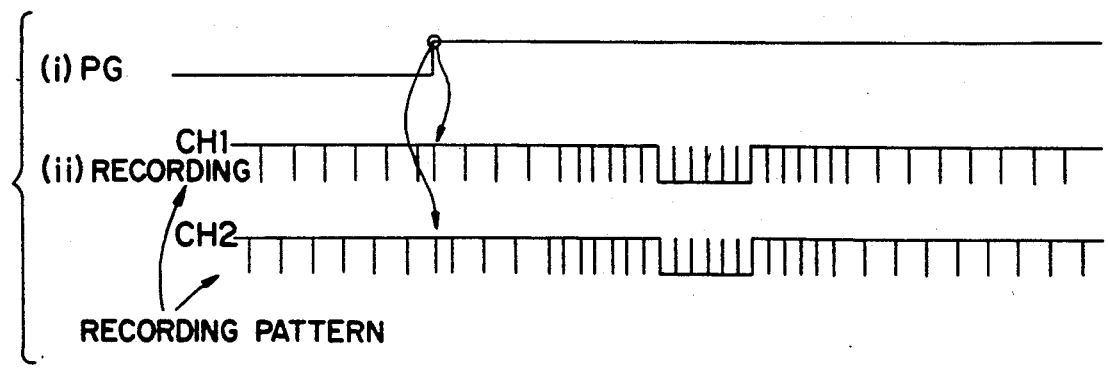
FIG. 14 is a schematic illustrating pre-overlapping for frame recording.

Also, in frame recording with pre-overlapping, as illustrated in FIG. 14 pre-overlapping develops the same waveforms as in an ordinary frame recording with no overlapping.

Figure 15:
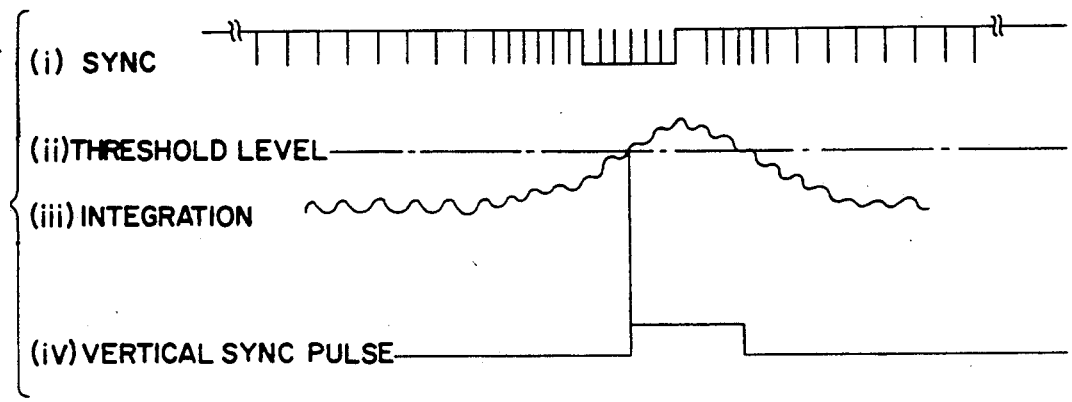
FIG. 15 is a schematic illustrating an ordinary vertical sync separation.
Figure 16:
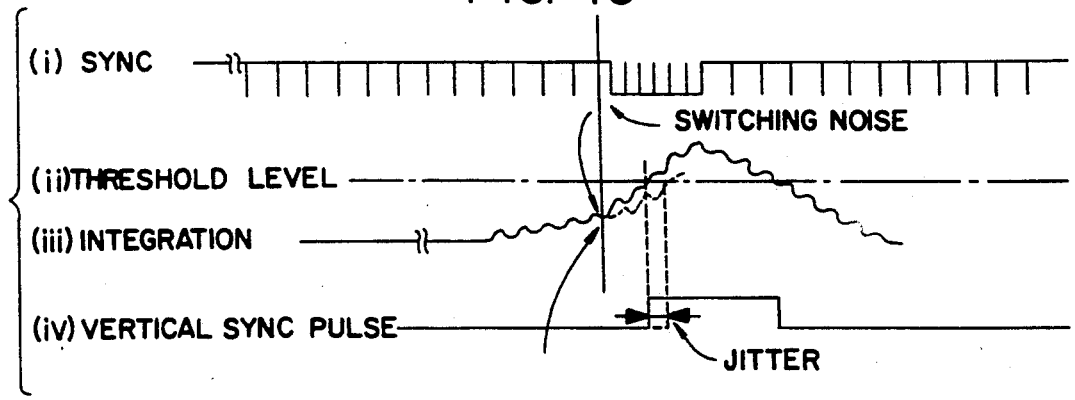
FIG. 16 is a schematic illustrating a vertical sync operation by post-overlapping.

From the switching noise due to the transition (beginning and end) of the recording current in an ordinary TV, as illustrated in FIG. 15, SYNC(i) is extracted from the video signal and is integrated (iii). When the integrated value reaches a certain level, it is determined as $V_{SYNC}$(iv), which is used as the trigger for vertical scanning. With post-overlapping, on the other hand, when a switching noise is in the pre-equalizing pulse or the vertical sync signal as illustrated in FIG. 16, the integrated value is varied, which results in a change in position of the vertical sync pulse. Furthermore, the magnitude of the switching noise is not constant but varies at every V (60 Hz). Therefore, resulting in jitters in the vertical sync pulse result.

When such a signal is reproduced on the TV, a vertical sync step out occurs (V-jitters occurs), and the image quality is considerably deteriorated.

With the pre-overlapping according to the embodiments of the present invention, since the phase of the switching noise is before the phase of the pre-equalizing pulse, the vertical sync pulse is not affected by the switching noise, and no sync step out occurs.

As a result, the pre-overlapping maintains the continuity of $H_{SYNC}$ over the post-overlapping. Thereby, the cause of skew is eliminated and vertical sync step out due to switching noise is prevented. Thus, even if the PG signal is shifted, missing of the video signal is prevented by the overlap recording.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still picture recording device for recording a video signal having horizontal and vertical scanning periods on a magnetic disc by drawing a circular track on said disc over an angle exceeding 360 degrees about a center of said disc so that said circular track is partly overlapped, comprising:

a PG yoke and a PG sensor disposed on said magnetic disc;

means for detecting a magnetic flux from said PG yoke and said PG sensor at each turn of said magnetic disc;

means for developing a rotation phase signal in response to an interaction between said magnetic flux from said PG yoke and said PG sensor, said rotation phase signal being used to start and end the recording of said video signal;

first PG signal generating means for developing a first PG signal by shaping and phase controlling said magnetic flux;

second PG signal generating means for developing a second PG signal every time said first PG signal is generated by delaying said first PG signal for a predetermined time and phase controlling said first PG signal;

means for starting the recording of said video signal in response to said first PG signal;

recording signal ending control means for ending the recording of said video signal in response to said second PG signal; and timing control means for overlap recording said video signal by an overlap amount which corresponds to a phase difference between said first and second PG signals;

whereby a final recording pattern of said video signal on said track is controlled to correspond with a single period from one second PG signal to a subsequent second PG signal immediately following said one second PG signal.

2. The still picture recording device as claimed in claim 1, wherein said overlap amount is determined by an amount of said phase difference between said first and second PG signals when said second PG signal is developed in response to said first PG signal.

3. The still picture recording device as claimed in claim 1, further comprising:

recording means for recording said video signal in both a field mode and a frame mode; and recording mode selecting means for selecting said video signal to be recorded in either said field mode or said frame mode.

4. A method for recording a video signal having horizontal and vertical scanning periods on a magnetic disc in a still picture recording device by drawing a circular track on said disc over an angle exceeding 360 degrees about a center of said disc so that said circular track is partly overlapped, comprising the steps of:

(a) detecting a magnetic flux from a PG yoke and a PG sensor disposed on said magnetic disc at each turn of said magnetic disc;

(b) developing a rotation phase signal in response to an interaction between said magnetic flux from said PG yoke and said PG sensor, said rotation phase signal being used to start and end the recording of said video signal;

(c) developing a first PG signal by shaping and phase controlling said magnetic flux;

(d) developing a second PG signal every time said first PG signal is generated by delaying said first PG signal for a predetermined time and phase controlling said first PG signal;

(e) starting the recording of said video signal in response to said first PG signal;

(f) ending the recording of said video signal in response to said second PG signal; and (g) overlap recording said video signal by an overlap amount which corresponds to a phase difference between said first and second PG signals;

whereby a final recording pattern of said video signal on said track is controlled to correspond with a single period from one second PG signal to a subsequent second PG signal immediately following said one second PG signal.

5. A method as claimed in claim 4, wherein said overlap amount is determined at said step (g) by an amount of said phase difference between said first and second PG signals when said second PG signal is developed in response to said first PG signal.

6. A method as claimed in claim 4, further comprising the steps of:

(h) recording said video signal in both a field mode and a frame mode; and (i) selecting said video signal to be recorded in either said field mode or said frame mode.

* * * * *